United States Patent
Prince

(10) Patent No.: US 7,384,150 B2
(45) Date of Patent: Jun. 10, 2008

(54) LIGHT EMITTING DIODE (LED) ILLUMINATION CONTROL SYSTEM AND METHOD

(75) Inventor: Dennis W. Prince, Banks, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 298 days.

(21) Appl. No.: 11/139,829

(22) Filed: May 27, 2005

(65) Prior Publication Data

US 2006/0268236 A1 Nov. 30, 2006

(51) Int. Cl.
G03B 21/14 (2006.01)
(52) U.S. Cl. .................. 353/31; 348/743; 362/231
(58) Field of Classification Search .............. 353/85, 353/30, 31, 86, 39, 84, 94; 362/341, 295, 362/231; 348/742–744, 771
See application file for complete search history.

(56) References Cited

U.S. PATENT DOCUMENTS

| | | | |
|---|---|---|---|
| 5,808,800 | A | 9/1998 | Handschy et al. |
| 5,971,545 | A | 10/1999 | Haitz |
| 6,195,136 | B1 | 2/2001 | Handschy et al. |
| 6,281,949 | B1 | 8/2001 | Matsui et al. |
| 6,392,656 | B1 | 5/2002 | Someya et al. |
| 6,445,505 | B1 | 9/2002 | Morgan |
| 6,520,648 | B2 | 2/2003 | Stark |
| 6,567,134 | B1 | 5/2003 | Morgan |
| 6,573,951 | B1 * | 6/2003 | Hewlett et al. ............. 348/770 |
| 6,644,814 | B2 | 11/2003 | Ogawa et al. |
| 6,796,655 | B2 | 9/2004 | Seki |
| 7,019,736 | B2 * | 3/2006 | Allen et al. ................. 345/207 |
| 7,106,276 | B2 * | 9/2006 | Akiyama ..................... 345/39 |
| 7,210,794 | B2 * | 5/2007 | Tangen ....................... 353/85 |
| 7,283,181 | B2 * | 10/2007 | Allen et al. ................. 348/744 |
| 2003/0142241 | A1 * | 7/2003 | Allen et al. ................. 348/742 |
| 2003/0231497 | A1 | 12/2003 | Sakata et al. |
| 2004/0036708 | A1 * | 2/2004 | Evanicky et al. ........... 345/691 |
| 2005/0122065 | A1 * | 6/2005 | Young ........................ 315/294 |
| 2005/0276471 | A1 * | 12/2005 | Shin et al. .................. 382/162 |
| 2006/0108952 | A1 * | 5/2006 | Adler et al. ................ 315/312 |
| 2006/0221019 | A1 * | 10/2006 | Morgan et al. .............. 345/84 |
| 2007/0030294 | A1 * | 2/2007 | Sawyers et al. ............ 345/690 |

(Continued)

FOREIGN PATENT DOCUMENTS

JP 10-333599 12/1998

(Continued)

OTHER PUBLICATIONS

Matthijs H. Keuper, Gerard Hubers, Steve Paolini, "26.1:RGB LED Illuminators for Pocket-Sized Projectors", SID 04 Digest, pp. 943-945 2004 ISSN 0004-0966X.

*Primary Examiner*—William C. Dowling

(57) ABSTRACT

An LED illumination system includes control circuitry and first, second and third colored LEDs. The control circuitry sequentially drives the first, second and third colored LEDs in a color cycle frame with relative duty cycles having a known relationship that achieves a color balance. The control circuitry also operates to introduce at least one spoke period in the color cycle frame, during which the first, second and third LEDs are driven in a manner that is controlled to provide brightness adjusting light that matches the color balance achieved by the relative duty cycles of the first, second and third LEDs during sequential driving thereof.

18 Claims, 3 Drawing Sheets

U.S. PATENT DOCUMENTS

2007/0058087 A1* 3/2007 Kettle et al. .............. 348/742

FOREIGN PATENT DOCUMENTS

| JP | 2004-070017 | 3/2004 |
| JP | 2004133312 A | 4/2004 |
| JP | 2004-163527 | 6/2004 |
| JP | 2004-325643 | 11/2004 |
| WO | WO2002080136 | 10/2002 |
| WO | WO2005019909 | 3/2005 |

* cited by examiner

LIGHT EMITTING DIODE (LED) ILLUMINATION CONTROL SYSTEM AND METHOD

BACKGROUND OF THE INVENTION

The present invention relates to a light emitting diode (LED) illumination system, and more particularly to a system and method for controlling an LED illumination system to provide brightness adjusting light during one or more spoke periods inserted into a color cycle frame.

Projection display systems can include a source of light, illumination optics, an image-forming device, projection optics and a projection screen. The illumination optics collect light from a light source and direct it to one or more image-forming devices. The image-forming device(s), controlled by an electronically conditioned and processed digital video signal, produces an image corresponding to the video signal. Projection optics then magnify the image and project it onto the projection screen. White light sources, such as arc lamps, in conjunction with color wheels have been and still are used as light sources for projection display systems. However, recently light emitting diodes (LEDs) have been introduced as an alternative source of light. Some advantages of LEDs include longer lifetime, higher efficiency and superior thermal characteristics.

Examples of image-forming devices frequently used in digital light processing systems are digital micro-mirror devices (DMDs) and liquid crystal type imaging devices such as liquid crystal on silicon (LCoS) and high temperature polysilicon (HTPS) imagers. These imagers feature an array of individually controllable elements, with the states of the elements being individually controlled by the data loaded in a memory cell associated with each element, to steer reflected or transmitted light and spatially map a pixel of video data to a pixel on a projection screen. Light reflected or transmitted by an element in an ON state passes through the projection optics and is projected onto the screen to create a bright field. On the other hand, light reflected or transmitted by an element in an OFF state is not passed through the projection optics, which results in a dark field. A color image may also be produced using these imagers, such as by utilizing color sequencing or alternatively by using three imagers, one for each primary color (red, blue and green).

Traditionally, color sequencing has been employed in projection displays that utilize an arc lamp light source and a color filter wheel. As LED light sources become more prevalent in projection displays, there will be an increasing need for a color sequencing system and method that is specifically designed to account for the unique operation of the LED light sources.

BRIEF SUMMARY OF THE INVENTION

The present invention is an LED illumination system having first, second and third colored LEDs, and a method of controlling such a system. Control circuitry is provided to sequentially drive the first, second and third colored LEDs in a color cycle frame with relative duty cycles having a known relationship that achieves a color balance. The control circuitry also operates to introduce at least one spoke period in the color cycle frame, during which the first, second and third LEDs are driven in a manner that is controlled to provide brightness adjusting light that matches the color balance achieved by the relative duty cycles of the first, second and third LEDs during sequential driving thereof.

DETAILED DESCRIPTION

Figure 1:
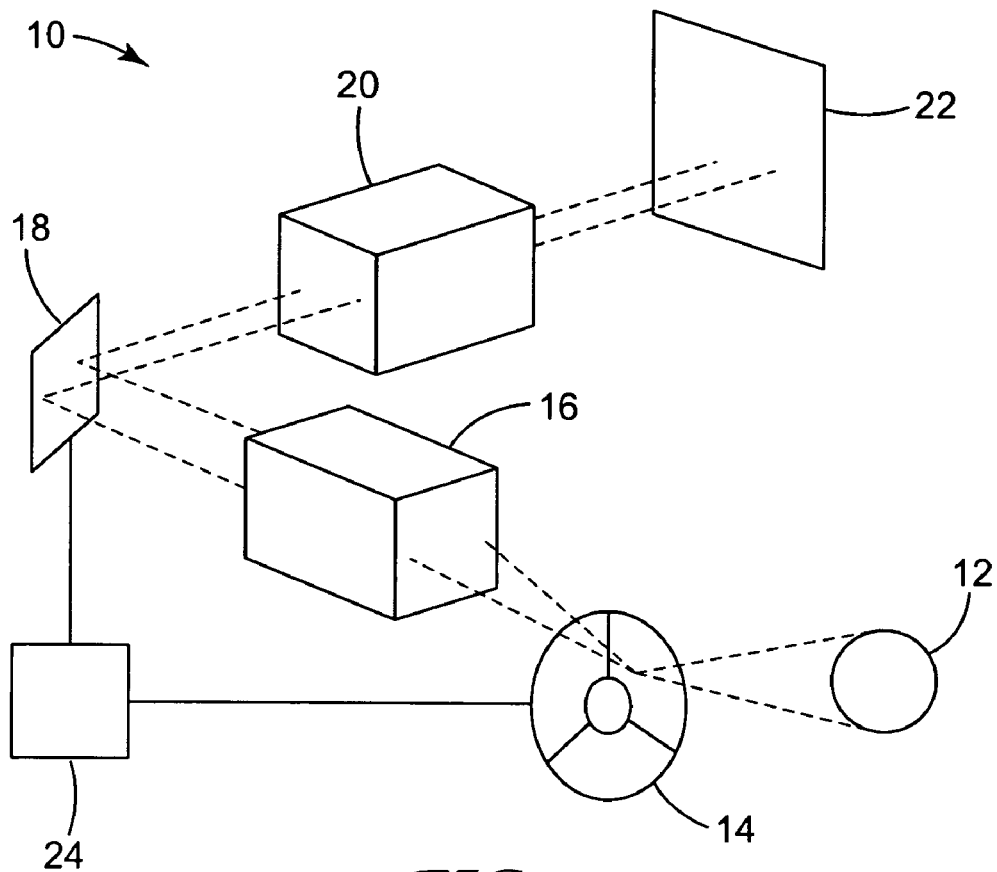
FIG. 1 is a diagram illustrating a traditional layout of components in a projection display system.

Color sequential projection displays operate on the basis of displaying a separate monochromatic image for each primary color, typically red, green and blue, at a rate high enough to avoid image flicker and color breakup. FIG. 1 is a diagram illustrating a traditional layout of components in a micro-display type projection display system 10, including light source 12, color modulator 14, illumination optics 16, imaging device 18, projection optics 20, viewing screen 22, and control circuitry 24. Light source 12 is traditionally an arc lamp that provides a broad spectrum of light (i.e., "white light"). The light from the arc lamp is directed at color modulator 14, which may be a color filter wheel, disk, drum or barrel that is rotated by an electric motor. As color modulator 14 rotates, the broad spectrum light is filtered to sequentially produce primary colors. The filtered light from color modulator 14 illuminates imaging device 18 by use of illumination optics 16.

The two primary types of color sequential imaging devices currently used in the consumer market are liquid crystal on silicon (LCoS) devices and digital micromirror devices (DMDs). Both of these devices possess the ability to operate at the high update rates required for color sequential operation, and either type of device (or other types of imaging devices able to achieve the required update rates) may be used to implement imaging device 18 shown in FIG. 1. Presently, high temperature polysilicon (HTPS) devices are not fast enough to perform color sequential operation, although future advances in that technology may result in those devices being an option for us as imaging device 18. Projection optics 20 direct images formed by imaging device 18 to viewing screen 22.

Electronic control circuitry 24 performs many functions within projection display system 10. Two such functions are timing synchronization and image data processing. Timing synchronization circuitry coordinates activities of imaging device 18 and color modulator 14 to ensure that proper image data is presented by imaging device 18 during the respective color period. Also, light source 12 is typically driven with an AC waveform and can produce irregularities at the point of commutation. These irregularities are synchronized to occur during a specific time that has the least impact on image reproduction or during a time that allows compensation to be performed.

For each primary color, intermediate brightness levels (gray scale) are achieved either by modulating the analog voltage levels driving picture elements (pixels) between varying degrees of on or off, or by modulating the pulse width of a pixel to be on for a longer or shorter period of time. The conversion of image data, from digital to analog, is performed by the image data processing circuitry.

Traditional color sequential projection systems are hindered in efficiently utilizing all of the light emanating from the color modulator. The light transition occurring at the seam of two color filters, known in the art as "spoke light," does not yield a color that is well defined, and is not a well-defined mix of two filters and may contain unfiltered light. Also, due to manufacturing variations, particularly in the manufacture of the filters of the color wheel, this light is inconsistent and unpredictable. For these reasons, some systems avoid using spoke light by placing the imaging device in an "off" state to prevent the light from reaching the screen.

Figure 2:
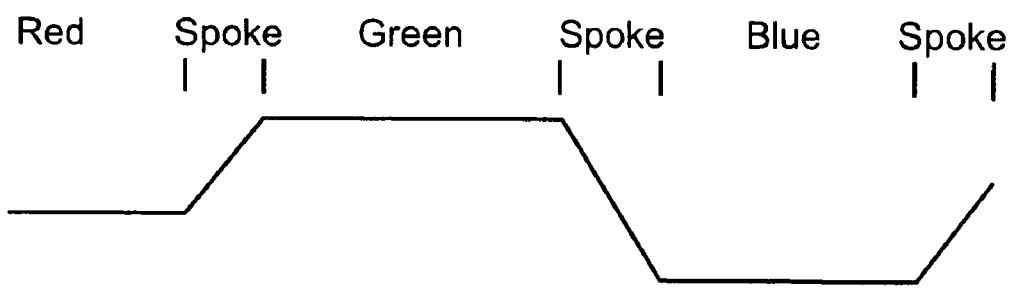
FIG. 2 is a graph illustrating the occurrence of spoke light between primary colors in typical projection imaging systems.

FIG. 2 is a graph illustrating the occurrence of spoke light between primary colors in typical projection imaging systems. The spoke light can occupy a significant portion of a frame period (defined as a complete revolution of the color filter wheel or a complete cycle through all primary colors), up to 20% in some systems. Therefore, complex algorithms and additional control circuitry have been developed to utilize spoke light. However, due to the unpredictable nature of this light, each system must be specifically calibrated to its particular color modulator.

Some color modulators include a non-filtered (clear) segment to increase the brightness of white and unsaturated portions of an image, at the cost of color saturation and the addition of a spoke period. This is known in the art as "white peaking." White peaking provides a brighter white level than can be obtained by the sum of the primary colors in a frame. While this white light is more predictable in nature than spoke light, it does not provide the same color temperature as the sum of the filtered color segments, and therefore cannot simply be added to the image formed on the screen. Utilization of non-filtered light, like spoke light, requires complex algorithms, additional control circuitry and color balance calibration.

Figure 3:
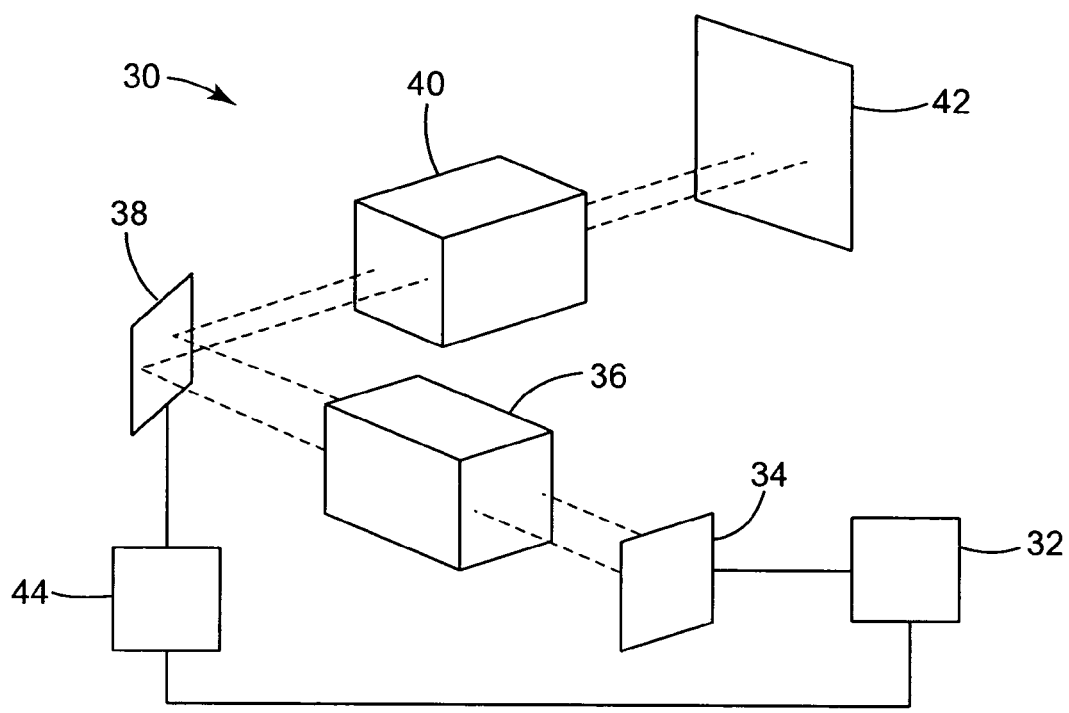
FIG. 3 is a diagram illustrating an exemplary LED-based projection display system.

Recent developments in LED technology have enabled LEDs to be employed as light sources even in applications requiring high brightness, such as many projection display applications. An exemplary LED-based projection display system 30 is shown in FIG. 3. System 30 includes LED driver circuit 32, LED arrays 34, illumination optics 36, imaging device 38, projection optics 40, viewing screen 42, and control circuitry 44. Illumination optics 36, imaging device 38, projection optics 40, and viewing screen 42 provide substantially the same functionality as illumination optics 16, imaging device 18, projection optics 20, and viewing screen 22 of FIG. 1. LED driver 32 includes at least three individual current sources to provide power to the red, blue and green LEDs of LED arrays 34, forming individual circuits of each color.

LED-based projection systems, sometimes even more so than traditional systems employing an arc lamp light source, can benefit from improved brightness, due to the strong demand in the computer and television industry for brighter displays and the technological limitations in the brightness of LEDs. As a result, white peaking would be useful in LED-based projection systems. However, in LED-based systems, there is no color filter wheel that can be modified to include a clear segment for providing white light, and the existing algorithms, electronics and calibration schemes are not applicable to a system having an LED light source. A suitable LED driving and control system to achieve white peaking is the subject of the present invention.

Figure 4:
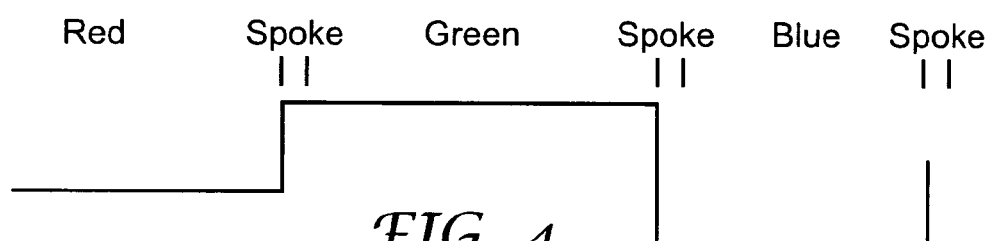
FIG. 4 is a graph illustrating the relative duty cycles of red, green and blue in an exemplary color cycle frame of a projection imaging system.

A primary goal of LED illuminators is to obtain prescribed red, green and blue (RGB) colors. Each color is described as a point in the Commission Internationale de l'Eclairage (CIE) color space. The color temperature or hue of white is a result of the sum of red, green and blue. The definition of color points and their relative brightnesses are found in the standards written for NTSC, SMPTE-C, Rec. 709, and other television standards. The color balance of red, green and blue is controlled according to the appropriate specification by defining the duty cycle for the red, green and blue LEDs of the light source assembly. FIG. 4 is a graph illustrating the relative duty cycles of red, green and blue in an exemplary system. The time period shown in FIG. 4, which includes a red cycle, a green cycle, and a blue cycle, is referred to herein as a light cycle frame. FIG. 4 also illustrates a spoke period during the transitions between colors (red to green, green to blue, and blue to red), although LED illumination systems do not need to utilize a traditional spoke period because of the fact that LEDs can be turned on and off almost instantaneously, meaning that the transition from one color to the next can be almost instantaneous.

The present invention inserts one or more spoke periods into an LED illumination system in order to improve the overall brightness of the image that can be formed. The introduction of one or more spoke periods will reduce the total amount of time per cycle that an individual color is on, but can be used to improve brightness by providing a mix of colors during the spoke period to perform white peaking.

Figure 5:
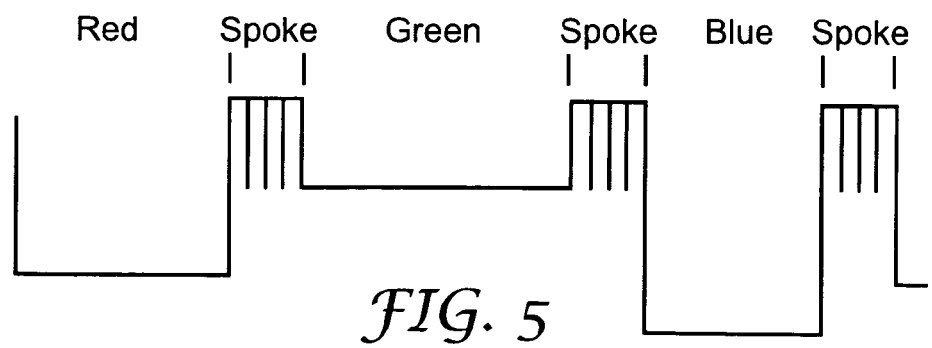
FIG. 5 is a graph illustrating the relative duty cycles of red, green and blue in a color cycle frame with spoke periods introduced at each color transition according to an exemplary embodiment of the present invention.

FIG. 5 is a graph illustrating the relative duty cycles of red, green and blue with spoke periods (indicated by the hashed regions of the graph) introduced at each color transition according to an exemplary embodiment of the present invention. The ratio of the total cycle time that is consumed by red, green and blue remains the same as was shown in FIG. 4, but the time that each color is provided is reduced according to the same ratio in order to introduce the spoke periods during color transitions. During the spoke periods, all three colors of light are turned on to produce white light that matches the color temperature of white produced by the overall cycle of colors during the red, green and blue periods. This concept can be referred to a "white-balancing."

White balancing the white light produced during the spoke periods prevents the overall color temperature of the display from being altered by white peaking. For example, if all three primary colors were turned on equally during the spoke periods, in many systems this combination of colors would provide a lower ratio of green light compared to red and blue light than is provided during normal color sequential operation in the light cycle frame. As a result, the white peaking process may change the overall hue of the display (if white balancing as disclosed herein is not performed).

Figures 6, 7, 8:
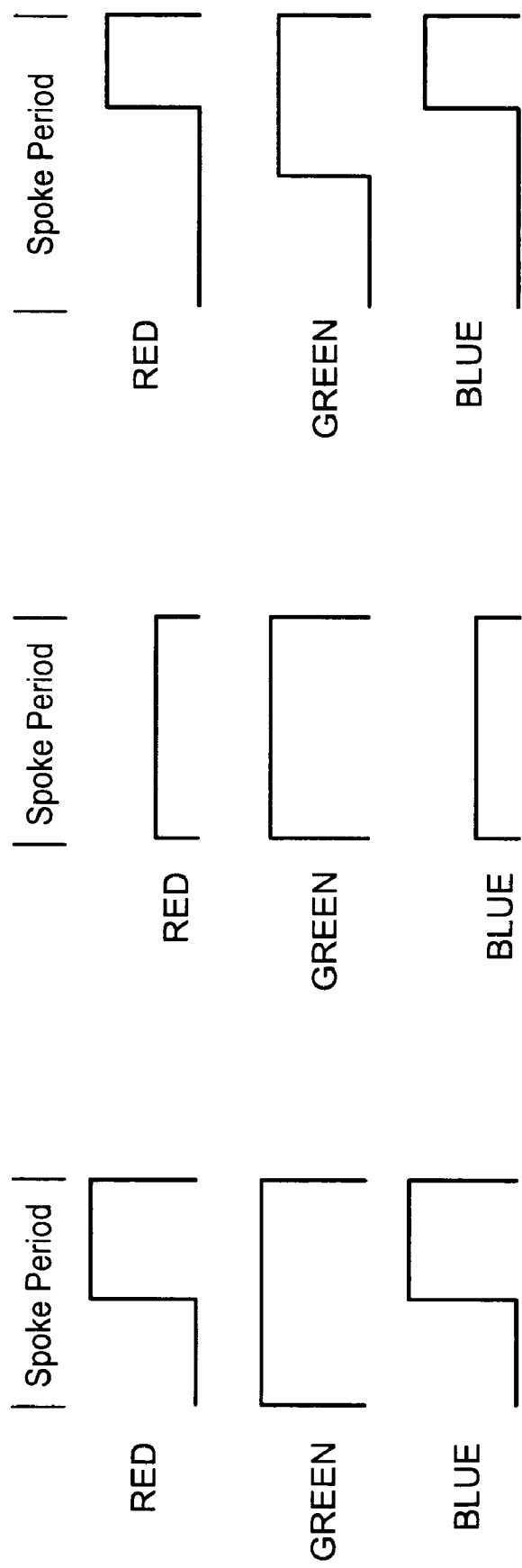
FIG. 6 is a graph illustrating pulse width modulation of signals to drive different colored LEDs during a spoke period to achieve white peaking according to one embodiment of the present invention.
FIG. 7 is a graph illustrating amplitude modulation of signals to drive different colored LEDs during a spoke period to achieve white peaking according to another embodiment of the present invention.
FIG. 8 is a graph illustrating pulse width modulation of signals to drive different colored LEDs during a spoke period to achieve gray level bit expansion according to a further embodiment of the present invention.

There are two ways to control the color temperature of the white light provided during the spoke periods, either by pulse width modulation or by amplitude modulation. To employ pulse width modulation, the color with the largest base duty cycle (usually green) may be turned on for the entire spoke period. The other colors are then turned on during the spoke period for an amount of time that gives the same ratio of on times as the duty cycles for the overall cycle time. This relationship is illustrated most clearly below with reference to Example 1, a graph of which is shown in FIG. 6.

EXAMPLE 1

Red base duty cycle: 0.278
Green base duty cycle: 0.444
Blue base duty cycle: 0.278
Spoke period: 240 micro-seconds (μs)
Green on-time during spoke period: 240 μs
Red on-time during spoke period: 0.278/0.444×240 μs=150.3 μs
Blue on-time during spoke period: 0.278/0.444×240 μs=150.3 μs Example 1 shows a scenario where a white-balanced light pulse is produced during each spoke period. It should be understood that it is also possible to achieve white-balancing on a per-frame basis (rather than a per-spoke basis) by adding up the on-times of the different colored LEDs for all of the spoke periods within a frame and controlling the total of the LED on-times for each frame to have the appropriate ratio. For example, in the scenario of Example 1, there are three spoke periods, with each spoke period having a green on-time of 240 μs, a red on-time of 150.3 μs, and a blue on-time of 150.3 μs. This results in a total green on-time during the light cycle frame of 720 μs, a total red on-time during the light cycle frame of 450.9 μs, and a total blue on-time during the frame of 450.9 μs. In an alternative, per-frame color balancing scheme, the different colored light sources could be turned on in the following arrangement:

| SPOKE 1 | SPOKE 2 | SPOKE 3 |
| --- | --- | --- |
| Green on-time: 240 μs | Green on-time: 240 μs | Green on-time: 240 μs |
| Red on-time: 240 μs | Red on-time: 0 μs | Red on-time: 210.9 μs |
| Blue on-time: 0 μs | Blue on-time: 240 μs | Blue on-time: 210.9 μs |

One advantage of pulse width modulation as the method for driving the LEDs is that a constant driving power level can be used during both the spoke period and the respective red, green and blue periods. This results in a lower cost driver circuit, since only one power level needs to be delivered by each driver. Also, as the LEDs age, there is less likely to be a shift in the color temperature of the spoke compared to the color temperature of the overall red/green/blue cycle, since the color of both periods will degrade at the same rate.

In an amplitude modulation method, white-balancing is achieved by adjusting the power delivered to the red, green, and blue LEDs according to the ratios of required brightness for the LEDs. This scenario is illustrated in FIG. 7.

In many LED illumination systems, the green LEDs are required to be turned on for a greater percentage of the overall cycle time to ensure that green colors are produced properly and to achieve the proper "white point" of the light source (producing a pure white color when all three LEDs are turned on for an entire cycle). This is illustrated by the relative on-times of the red, green and blue LEDs of Example 1 described above. The white light produced during spoke periods, in order to provide effective white peaking that does not affect the overall color balance of the illumination system, has a color temperature that mimics the white point of the overall system, such as by pulse width modulation or amplitude modulation to boost the brightness of light produced by the green LEDs with respect to the red and blue LEDs.

In a manner similar to the white peaking operation described above, it is also possible to achieve gray level "bit expansion." Some micro-displays have difficulty in producing very dim light levels, as this requires a very small light pulse. The smallest achievable light pulse corresponds to the smallest pulse width modulation time period, and may be limited by the maximum operational speed of the imager. Therefore, an additional "dark" segment is sometimes used in traditional color filter wheel-based systems. The dark segment facilitates gray level bit expansion by providing a way to produce darker light pulses.

LED illuminators can be operated to provide bit expansion during the spoke periods that are defined above with respect to white peaking, either in place of white peaking during the spoke periods or in addition to white peaking spoke periods (resulting in both white peaking and gray level bit expansion spoke periods). The "dark" spoke periods are color balanced by controlling the brightnesses of red, green and blue LEDs to be the same as the ratio of the overall frame, as described above with respect to white peaking, so that the overall color balance provided by the illuminator is not affected. A dark spoke period for achieving gray level bit expansion by providing a spoke period with half brightness is described below as Example 2, and is illustrated in FIG. 8.

EXAMPLE 2

Red base duty cycle: 0.278
Green base duty cycle: 0.444
Blue base duty cycle: 0.278
Spoke period: 240 μs
Green on-time during spoke period: 120 μs
Red on-time during spoke period: 0.278/0.444×120 μs=75.14 μs
Blue on-time during spoke period: 0.278/0.444×120 μs=75.14 μs Example 2 shows a scenario where a color-balanced "dark" pulse is produced during each spoke period. It should be understood that it is also possible to achieve color-balancing on a per-frame basis (rather than a per-spoke basis) by adding up the on-times of the different colored LEDs for all of the spoke periods within a frame and controlling the total of the LED on-times for each frame to have the appropriate ratio, in the same manner described above with respect to Example 1.

The present invention, as described above with respect to exemplary embodiments, introduces one or more spoke periods during a color cycle frame of an LED illumination system. Although the spoke periods are described in the embodiments above as occurring during transitions between primary colors, consistent with the traditional understanding of a "spoke" period that refers to color transitions on a color filter wheel, it should be understood that in an LED illumination system, it is possible to insert spoke periods at any point of the color cycle frame, due to the ability of LEDs to be nearly instantaneously turned on and off. During the spoke periods, brightness adjusting light is provided (in the form of white peaking and/or gray level bit expansion (or "dark peaking")), with the color balance of the white or dark hue during the spoke period being controlled to match the color balance achieved by the duty cycles of the primary colors in each color cycle. As a result, the brightness of an image provided by the LED illumination system can be adjusted as needed without affecting the color balance or "white point" of the image.

The foregoing description has referred to exemplary systems having three colored LED light sources (red, green and blue). Although systems that sequentially provide these three primary colors are most prevalent in LED illumination systems, it should be understood by those skilled in the art that the principles of the present invention (providing white or dark peaking with color balanced combinations of light during spoke periods inserted into a color cycle frame) are equally applicable to systems that provide a greater number of colors or a different set of primary colors. For example, a system could employ light sources that provide up to six different colors (red, green, blue, yellow, cyan and magenta), with one or more spoke periods inserted into the color cycle frame to brighten the image or to achieve gray level bit expansion in the manner described above.

Although the present invention has been described with reference to preferred embodiments, workers skilled in the art will recognize that changes may be made in form and detail without departing from the spirit and scope of the invention. For example, the disclosed embodiments have been described as employing red, green and blue LED light sources. It should be understood by those skilled in the art that the principles of the present invention are applicable to any light sources that are able to be turned on and off nearly instantaneously, so that the brightness adjusting light provided during spoke periods of a color cycle frame can be controlled to match the color balance of light provided by the color sequential operation of the light sources in the frame.

The invention claimed is:

1. A method of controlling a light emitting diode (LED) illumination system that includes a first colored LED, a second colored LED and a third colored LED, the method comprising:
   sequentially operating the first colored LED, the second colored LED, and the third colored LED in a color cycle frame with relative duty cycles having a known relationship that achieves a color balance; and
   operating the first colored LED, the second colored LED and the third colored LED during at least one spoke period in the color cycle frame, the operation of the first colored LED, the second colored LED and the third colored LED during the at least one spoke period being controlled to provide brightness adjusting light that matches the color balance achieved by the relative duty cycles of the first colored LED, the second colored LED, and the third colored LED during sequential operation thereof, wherein the operation of the first colored LED, the second colored LED and the third colored LED during the at least one spoke period is controlled by pulse width modulation of signals driving the LEDs.

2. The method of claim 1, wherein the brightness adjusting light provided during the at least one spoke period is provided, to achieve white peaking.

3. The method of claim 1, wherein the brightness adjusting light provided during the at least one spoke period is provided to achieve gray level bit expansion.

4. The method of claim 1, wherein the at least one spoke period occurs during a transition between sequential operation of different ones of the first colored LED, the second colored LED, and the third colored LED.

5. The method of claim 1, wherein the first, second and third colored LEDs are red, green and blue.

6. The method of claim 5, wherein the relative duty cycle of the green LED is greater than the relative duty cycles of the red LED and the blue LED.

7. A light emitting diode (LED) illumination system comprising:
   a first colored LED;
   a second colored LED;
   a third colored LED;
   control circuitry operatively connected to the first, second and third colored LEDs, the control circuitry being operable to:
   sequentially drive the first colored LED, the second colored LED, and the third colored LED in a color cycle frame with relative duty cycles having a known relationship that achieves a color balance; and
   drive the first colored LED, the second colored LED and the third colored LED during at least one spoke period in the color cycle frame, the driving of the first colored LED, the second colored LED and the third colored LED during the at least one spoke period in a manner that is controlled to provide brightness adjusting light that matches the color balance achieved by the relative duty cycles of the first colored LED, the second colored LED, and the third colored LED during sequential driving thereof, wherein the control circuitry controls the driving of first colored LED, the second colored LED and the third colored LED during at least one spoke period by pulse width modulation of signals driving the LEDs.

8. The LED illumination system of claim 7, wherein the control circuitry drives the first colored LED, the second colored LED and the third colored LED during at least one spoke period to achieve white peaking.

9. The LED illumination system of claim 7, wherein the control circuitry drives the first colored LED, the second colored LED and the third colored LED during at least one spoke period to achieve gray level bit expansion.

10. The LED illumination system of claim 7, wherein the at least one spoke period occurs during a transition between sequential operation of different ones of the first colored LED, the second colored LED, and the third colored LED.

11. The LED illumination system of claim 7, wherein the first, second and third colored LEDs are red, green and blue.

12. The LED illumination system of claim 11, wherein the relative duty cycle of the green LED is greater than the relative duty cycles of the red LED and the blue LED.

13. A method of controlling an illumination system that includes first, second and third light sources for respectively providing first, second and third colors of light, the control scheme comprising:
   sequentially operating the first, second and third light sources in a color cycle frame with relative duty cycles having a known relationship that achieves a color balance; and
   operating the first, second and third light sources during at least one spoke period in the color cycle frame in a manner that is controlled to provide brightness adjusting light that matches the color balance achieved by the relative duty cycles of the first, second and third light sources during sequential operation thereof;

wherein the operation of the first, second and third light sources during the at least one spoke period is controlled by pulse width modulation of signals driving the light sources.

14. The method of claim 13, wherein the brightness adjusting light provided during the at least one spoke period is provided to achieve white peaking.

15. The method of claim 13, wherein the brightness adjusting light provided during the at least one spoke period is provided to achieve gray level bit expansion.

16. A method of controlling a light emitting diode (LED) illumination system that includes a first colored LED, a second colored LED and a third colored LED, the method comprising:

sequentially operating the first colored LED, the second colored LED, and the third colored LED in a color cycle frame with relative duty cycles having a known relationship that achieves a color balance; and operating the first colored LED, the second colored LED and the third colored LED during at least one spoke period in the color cycle frame, the operation of the first colored LED, the second colored LED and the third colored LED during the at least one spoke period being controlled to provide brightness adjusting light that matches the color balance achieved by the relative duty cycles of the first colored LED, the second colored LED, and the third colored LED during sequential operation thereof, herein the brightness adjusting light provided during the at least one spoke period is provided to achieve gray level bit expansion.

17. A light emitting diode (LED) illumination system comprising:

a first colored LED;

a second colored LED;

a third colored LED;

control circuitry operatively connected to the first, second and third colored LEDs, the control circuitry being operable to:

sequentially drive the first colored LED, the second colored LED, and the third colored LED in a color cycle frame with relative duty cycles having a known relationship that achieves a color balance; and drive the first colored LED, the second colored LED and the third colored LED during at least one spoke period in the color cycle frame, the driving of the first colored LED, the second colored LED and the third colored LED during the at least one spoke period in a manner that is controlled to provide brightness adjusting light that matches the color balance achieved by the relative duty cycles of the first colored LED, the second colored LED, and the third colored LED during sequential driving thereof, wherein the control circuitry drives the first colored LED, the second colored LED and the third colored LED during at least one spoke period to achieve gray level bit expansion.

18. A method of controlling an illumination system that includes first, second and third light sources for respectively providing first, second and third colors of light, the control scheme comprising:

sequentially operating the first, second and third light sources in a color cycle frame with relative duty cycles having a known relationship that achieves a color balance; and operating the first, second and third light sources during at least one spoke period in the color cycle frame in a manner that is controlled to provide brightness adjusting light that matches the color balance achieved by the relative duty cycles of the first, second and third light sources during sequential operation thereof, wherein the brightness adjusting light provided during the at least one spoke period is provided to achieve gray level bit expansion.

* * * * *

UNITED STATES PATENT AND TRADEMARK OFFICE
CERTIFICATE OF CORRECTION

| | |
|---|---|
| PATENT NO. | : 7,384,150 B2 |
| APPLICATION NO. | : 11/139829 |
| DATED | : June 10, 2008 |
| INVENTOR(S) | : Dennis W. Prince |

Page 1 of 1

It is certified that error appears in the above-identified patent and that said Letters Patent is hereby corrected as shown below:

Column 7
Line 67, in Claim 2, delete "provided," and insert -- provided --, therefor.

Column 9
Line 30, in Claim 16, delete "herein" and insert -- wherein --, therefor.

Signed and Sealed this

Thirtieth Day of September, 2008

JON W. DUDAS
*Director of the United States Patent and Trademark Office*